(12) United States Patent
Jiang et al.

(10) Patent No.: US 12,719,625 B2
(45) Date of Patent: Aug. 25, 2026

(54) TIME SHARING AMONG MULTIPLE WIRELESS STATIONS DURING A SINGLE RESOURCE UNIT

(71) Applicant: Apple Inc., Cupertino, CA (US)

(72) Inventors: Jinjing Jiang, San Jose, CA (US); Lochan Verma, Danville, CA (US); Jarkko L Kneckt, Los Gatos, CA (US); Yong Liu, Campbell, CA (US); Ahmad Reza Hedayat, Carlsbad, CA (US); Tianyu Wu, Fremont, CA (US); Zhou Lan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 18/472,655

(22) Filed: Sep. 22, 2023

(65) Prior Publication Data

US 2024/0106584 A1 Mar. 28, 2024

Related U.S. Application Data

(60) Provisional application No. 63/415,883, filed on Oct. 13, 2022, provisional application No. 63/409,360, filed on Sep. 23, 2022.

(51) Int. Cl.

| | |
|---|---|
| ***H04L 5/00*** | (2006.01) |
| ***H04W 72/121*** | (2023.01) |
| ***H04W 72/23*** | (2023.01) |

(52) U.S. Cl.

CPC ......... *H04L 5/0007* (2013.01); *H04W 72/121* (2013.01); *H04W 72/23* (2023.01)

(58) Field of Classification Search

CPC .... H04L 5/0007; H04W 72/23; H04W 72/121

See application file for complete search history.

(56) References Cited

U.S. PATENT DOCUMENTS

| | | | | |
|---|---|---|---|---|
| 8,718,011 | B1 | 5/2014 | Muharemovic | |
| 2008/0130722 | A1* | 6/2008 | Choi | H04L 27/2655 375/150 |
| 2014/0169387 | A1* | 6/2014 | Kim | H04L 69/22 370/473 |
| 2021/0007137 | A1* | 1/2021 | Abouelseoud | H04W 74/02 |
| 2022/0272754 | A1 | 8/2022 | Lei | |
| 2023/0007688 | A1 | 1/2023 | Xu | |

(Continued)

*Primary Examiner* — Gbemileke J Onamuti

(74) *Attorney, Agent, or Firm* — Kowert, Hood, Munyon, Rankin & Goetzel, P.C.

(57) ABSTRACT

Payload transmission of multiple stations on a single resource unit may be performed. New and/or updated signaling may be introduced to enable a transmitter, e.g., an access point (AP), to include information/signaling in the preamble or in other frames. A receiver (e.g., a wireless station) that receives this information/signaling may accordingly determine in which RU it should decode to receive its allocated data or payload, allowing multiple receivers or STAs to share a single resource unit (RU). The new/updated signaling may include modified hybrid downlink multiuser signaling in Ultra High Reliability Signal (UHR-SIG), a group association identifier (gAID), a predefined special AID corresponding to an RU with use of a Bloom filter, multiple predefined special AIDs each corresponding to a non-overlapping group of wireless stations, and/or signaling announcing time sharing of single RUs.

20 Claims, 7 Drawing Sheets

(56) References Cited

U.S. PATENT DOCUMENTS

2023/0155820 A1* 5/2023 Wang ...................... H04L 9/085
713/180
2023/0328718 A1* 10/2023 Yu ..................... H04W 72/1263
370/329

* cited by examiner

TIME SHARING AMONG MULTIPLE WIRELESS STATIONS DURING A SINGLE RESOURCE UNIT

PRIORITY CLAIM

This application claims benefit of priority of U.S. provisional application Ser. No. 63/415,883 titled "Time Sharing Among Multiple Wireless Stations During a Single Resource Unit", filed Oct. 13, 2022, and further claims benefit of priority to U.S. provisional application Ser. No. 63/409,360 titled "Time Sharing Among Multiple Wireless Stations During a Single Resource Unit", filed Sep. 23, 2022, both of which are hereby incorporated by reference in their entirety as though fully and completely set forth herein.

FIELD OF THE INVENTION

The present application relates to wireless communications, including time sharing among multiple wireless stations during a single resource unit in wireless local area network (WLAN) communications, for example in IEEE 802.11 communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards.

One popular short/intermediate range wireless communication standard is wireless local area network (WLAN). Most modem WLANs are based on the IEEE 802.11 standard (or 802.11, for short). WLANs are marketed under the Wi-Fi brand name. WLAN networks link one or more devices to a wireless access point, which in turn provides connectivity to the wider area Internet. In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

There may be occasions when time sharing on a single resource unit for multiple wireless stations (that is, for multiple stations using a single resource unit) needs to be supported, for example during a downlink (DL) orthogonal frequency division multiple access (OFDMA) transmission. Improvements are therefore desired.

SUMMARY OF THE INVENTION

Embodiments are presented herein of, inter alia, of methods and procedures for multiple wireless stations time sharing a resource unit (RU) while communicating with the same transmitter. To put it another way, various embodiments presented herein relate to time sharing among multiple wireless stations for communications with a transmitter during a single RU. Embodiments are further presented herein for wireless communication systems containing at least wireless communication devices or user equipment devices (UEs) and/or access points (APs) communicating with each other within the wireless communication systems.

In some embodiments, payload transmission of multiple stations on a single resource unit (RU) may be performed. New and/or updated signaling may be introduced to enable a transmitter, e.g., an access point (AP) operating according to IEEE 802.11 standards, to include information/signaling in the preamble or in other frames. A given receiver (e.g., a wireless station) that receives this information/signaling may accordingly determine which RU it should monitor to decode transmitted packet(s) in order to receive data or payload allocated to the given receiver. This allows multiple receivers or STAs to share a single resource unit (RU). In the context of IEEE 802.11 communications, the new/updated signaling may include modified hybrid downlink multiuser signaling in Ultra High Reliability Signal (UHR-SIG), a group association identifier (gAID), a predefined special AID corresponding to an RU with use of a Bloom filter, multiple predefined special AIDs each corresponding to a non-overlapping group of wireless stations, and/or signaling announcing time sharing of single RUs.

Wireless Station Operations

According to the above, in some embodiments, a wireless station may receive information from an access point (AP), the information indicating to the wireless station that the wireless station is to time-share a resource unit (RU) with one or more other wireless stations also communicating with the AP. The wireless station may use the RU in a time-shared manner with the one or more other wireless stations during wireless communications with the AP, responsive to the information indicating that the wireless station is to time-share the RU. The wireless station may use the RU in the time-shared manner for downlink orthogonal frequency-division multiple access communications with the AP. The information may be received in a Physical Layer Protocol Data Unit (PPDU) frame, with the information provided via a reserve bit set in a universal signal (U-SIG) field of the PPDU frame, and a specified number of bits in a common field of the PPDU frame.

In some embodiments, the information may include a group association identifier (gAID), with the wireless station and one or more of the one or more other wireless stations associated with the gAID. The information may be received in a PPDU frame with the gAID used by the AP for a user specific field in an ultra-high reliability signal (UHR-SIG) field of the PPDU frame. The user specific field may include an association identifier (AID) list for each RU. The wireless station may search the AID list to determine whether an AID identifying the wireless station is included in the AID list.

In some embodiments, the information may include a special AID associated with the RU, and the wireless station may determine whether the wireless station is associated with the special AID. The wireless station may determine whether the wireless station is associated with the special AID by using a Bloom filter. The information may be received in a PPDU frame, with the Bloom filter provided at the beginning of the PPDU frame.

In some embodiments, the information may be received in a packet frame. The information may include a predefined AID associated with the wireless station and designated wireless stations of the one or more other wireless stations. The information may indicate to the wireless station which RU the wireless station is associated with.

Access Point Operations

In some embodiments, an access point (AP) may transmit information to a wireless station, the information indicating to the wireless station that the wireless station is to time-share a resource unit (RU) with one or more other wireless stations also communicating with the AP. The AP may use the RU to communicate in a time-shared manner with the wireless station and the one or more other wireless stations, responsive to the information indicating that the wireless station is to time-share the RU.

The AP may transmit at least a portion of the information in a preamble. In some cases, the AP may transmit at least a portion of the information via special signaling indicating to the wireless station which RU the wireless station is associated with.

Wireless Station and Transmitter Operations

In some embodiments, a wireless station may receive information from a transmitter, with the information indicating to the wireless station that the wireless station is to time-share a resource unit (RU) with one or more other wireless stations also communicating with the transmitter. The wireless station may use the RU in a time-shared manner with the one or more other wireless stations during wireless communications with the transmitter, responsive to the information indicating that the wireless station is to time-share the RU.

The wireless station may use the RU in the time-shared manner for downlink orthogonal frequency-division multiple access communications with the transmitter. The information may be received in a packet frame, and may be provided via a reserve bit set in a preamble of the packet frame, and a specified number of bits in a common field of the packet frame. The information may include a group identifier that identifies a group of devices that includes the wireless station and one or more of the one or more other wireless stations. The information may be received in a packet frame, and the group identifier may used by the transmitter for a user specific field in the packet frame. The user specific field may include a device identifier list for each RU.

The wireless station may search the device identifier list to determine whether an identifier identifying the wireless station is included in the identifier list. The information may include a special identifier associated with the RU, and the wireless station may determine whether it is associated with the special identifier. The wireless station may determine whether it is associated with the special identifier by using a Bloom filter. The information may be received in a packet frame, with the Bloom filter provided at the beginning of the packet frame. The information may include a predefined identifier associated with the wireless station and designated wireless stations of the one or more other wireless stations.

In some embodiments, a transmitter may transmit information to a wireless station, with the information indicating to the wireless station that the wireless station is to time-share a resource unit (RU) with one or more other wireless stations also communicating with the transmitter. The transmitter may use the RU to communicate in a time-shared manner with the wireless station and the one or more other wireless stations, responsive to the information indicating that the wireless station is to time-share the RU. The transmitter may transmit at least a portion of the information in a preamble, and may transmit at least a portion of the information via special signaling indicating to the wireless station which RU the wireless station is associated with. In some embodiments, the transmitter may transmit a beacon frame that includes information conveying a predefined number that indicates the number of symbols to be used for wireless communications with the transmitter by a receiver that receives the beacon frame.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
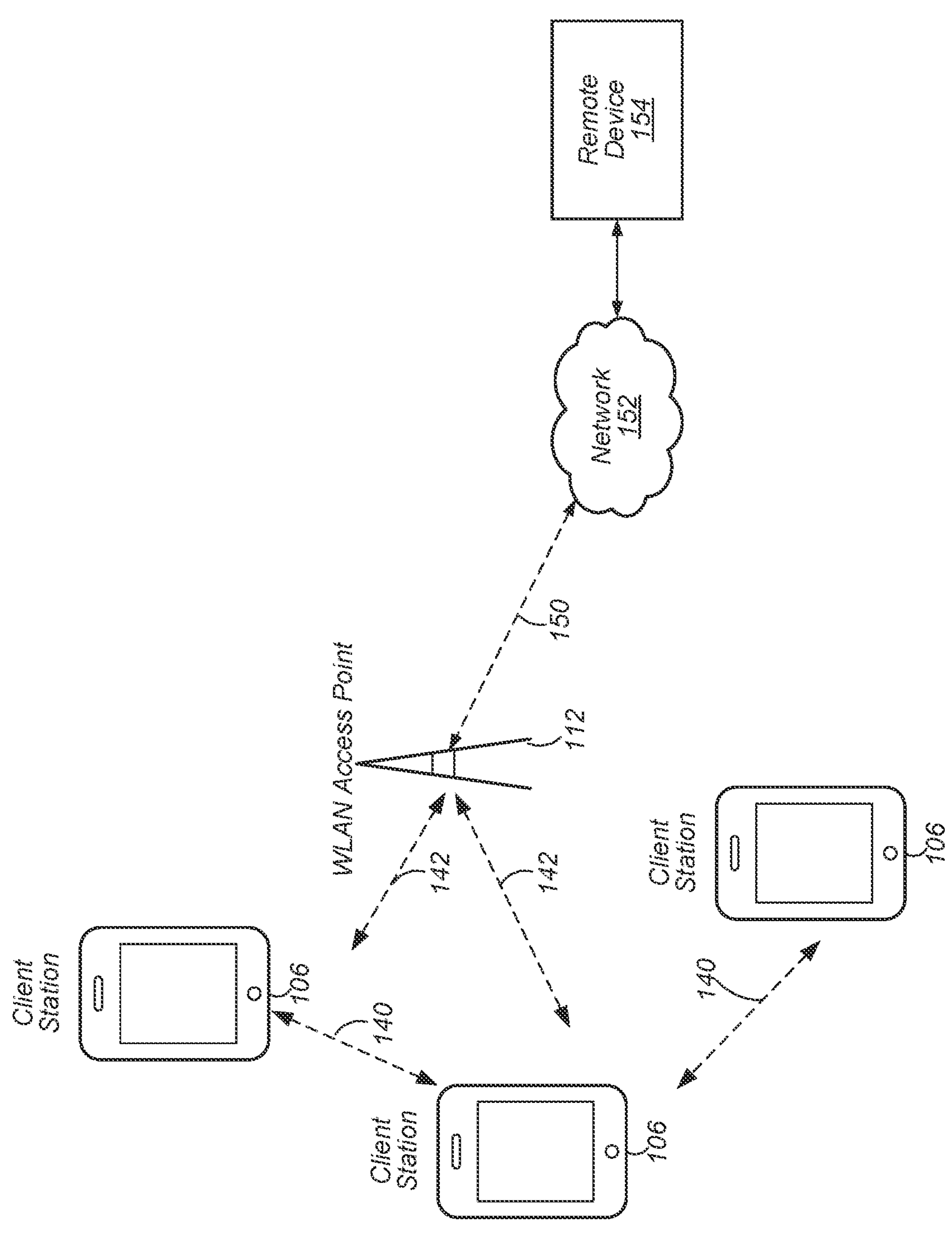
FIG. 1 illustrates an example WLAN communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
AP: Access Point
DL: Downlink (from AP to UE)
UL: Uplink (from UE to AP)
TX: Transmit/Transmission
RX: Receive/Reception
LAN: Local Area Network
WLAN: Wireless LAN
RAT: Radio Access Technology
STA: (Wireless) Station
PE: Privacy Enhanced
BSS: Basic Service Set
PLCP: Physical Layer Convergence Protocol
PSDU: PLCP Service Data Unit (Physical Layer Service Data Unit)
MPDU: Mac Protocol Data Unit
PPDU: Physical Protocol Data Unit
PHY: Physical (Layer)
DST: Destination (station or terminal)
RA: Receiver Address
TA: Transmitter Address
BA: Block Acknowledgment
TID: Traffic Identifier
MGMT: Management
MU: Multi User
AID: Association ID
EHT: Extremely Hight Throughput
OMI: Operation Mode Indication
UHR: Ultra High Reliability
STF: Short Training Field
LTF: Long Training Field
RU: Resource Unit
STF: Short Training Field
LTF: Long Training Field
U-SIG: Universal Signal
UHR-SIG: UHR Signal
L-SIG: Legacy (non-high-throughput) Signal
RL-SIG: Repeated Legacy (non-high-throughput) Signal
PE: Packet Extension
MUBAR: Multiuser Block Acknowledgement Request
QoS: Quality of Service
OFDMA: Orthogonal Frequency-Division Multiple Access

TERMS

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™ Microsoft XBox™, etc.), portable gaming devices (e.g., Nintendo DS™, PlayStation Portable™, Gameboy Advance™, iPod™), laptops, wearable devices (e.g. smart watch, smart glasses), PDAs, portable Internet devices, music players, data storage devices, or other handheld devices, unmanned aerial vehicles (e.g., drones) and unmanned aerial controllers, etc.

Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Processor—refers to various elements (e.g., circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation. For example, in 5G NR, the operating frequency bands are categorized in two groups. More specifically, per 3GPP Release 15, frequency bands are designated for different frequency ranges (FR) and are defined as FR1 and FR2, with FR1 encompassing the 410 MHz-7125 MHz range and FR2 encompassing the 24250 MHz-52600 MHz range.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

WLAN—The term "WLAN" has the full breadth of its ordinary meaning, and at least includes a wireless communication network or RAT that is serviced by WLAN access points and which provides connectivity through these access points to the Internet. Most modem WLANs are based on IEEE 802.11 standards and are marketed under the name "Wi-Fi". A WLAN network is different from a cellular network.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Bloom Filter—A Bloom filter is a space-efficient probabilistic data structure that may be used to determine whether an element is a member of a set. False positive matches are possible, but false negatives are not. Accordingly, a query returns either "possibly in set" or "definitely not in set" result. Elements may be added to but not removed from the set, which may be addressed with the counting Bloom filter variant; the more items added, the larger the probability of false positives.

TLV—Type-Length-Value or Tag-Length-Value) is an encoding scheme used for optional informational elements in a certain protocol. A TLV-encoded data stream contains code related to the record type, the record value's length, and finally the record value itself.

RU—Resource Unit is a unit in OFDMA terminology, used in, for example, 802.11ax WLAN, to denote a group of 78.125 kHz bandwidth subcarriers (tones) used in both downlink (DL) and uplink (UL) transmissions. With OFDMA, different transmit powers may be applied to different RUs. There may be a maximum of 9 RUs for 20 MHz bandwidth, 18 in case of 40 MHz and more in case of 80 or 160 MHz bandwidth. The RUs enable an Access Point (AP) station to be accessed by WLAN stations simultaneously and efficiently.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN/WPAN System

FIG. 1 illustrates an example WLAN/WPAN system according to some embodiments. As shown, the exemplary WLAN/WPAN system includes a plurality of wireless client stations or devices, or user equipment (UEs), 106 that may communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN/WPAN system via the network 152. For example, the remote device 154 may be another wireless client station. The WLAN/WPAN system may operate according to any of various communications standards, such as the various IEEE 802.11 and IEEE 802.15 standards. Accordingly, in addition to communicating via AP 112, wireless devices 106 may communicate directly with one or more neighboring mobile devices (e.g., via direct communication channels 140), without use of the access point 112.

In some embodiments, as further described below, a wireless device 106 may perform methods for time sharing for multiple stations (STAs) on a single resource unit (RU) for a given transmission, for example in a downlink (DL) orthogonal frequency division multiple access (OFDMA) transmission.

Figure 2:
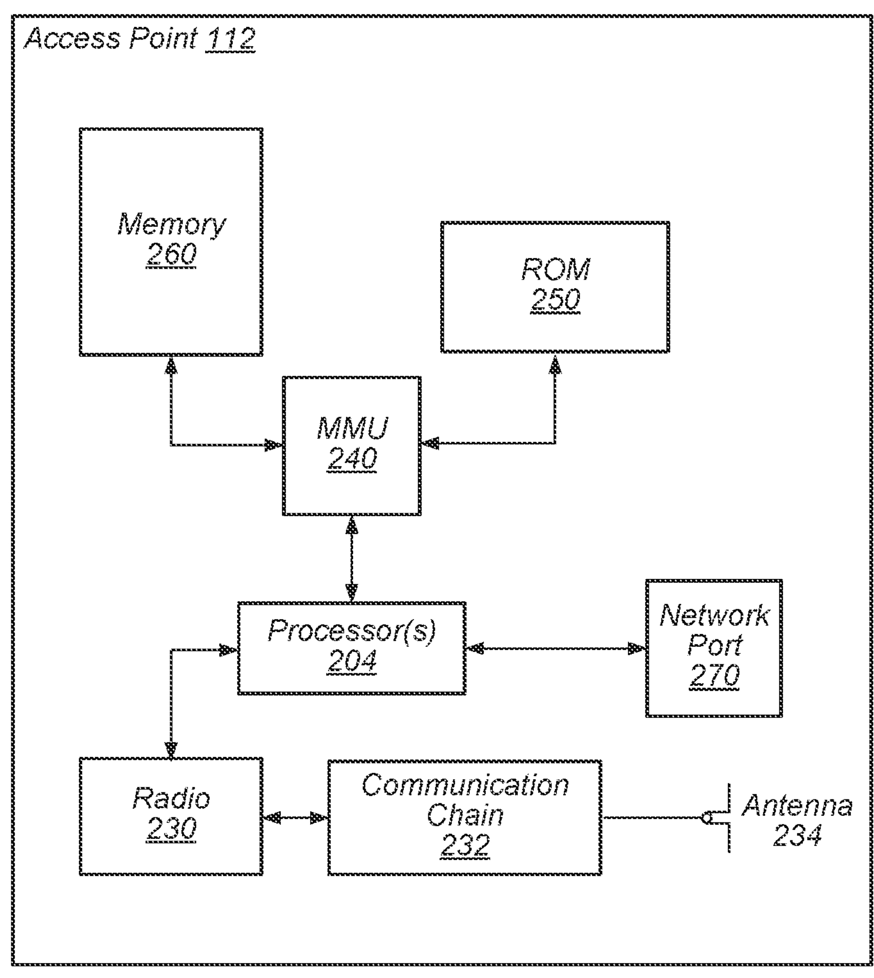
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which receive addresses from the processor(s) 204 and to translate those addresses to locations in memory (e.g., memory 260 and read only memory (ROM) 250) or to other circuits or devices.

The AP 112 may include at least one network port 270. The network port 270 may couple to a wired network and provide a plurality of devices, such as mobile devices 106, access to the Internet. For example, the network port 270 (or an additional network port) may couple to a local network, such as a home network or an enterprise network. For example, port 270 may be an Ethernet port. The local network may provide connectivity to additional networks, such as the Internet.

The AP 112 may include at least one antenna 234, which may operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may communicate via Wi-Fi or WLAN, e.g., 802.11. The wireless communication circuitry 230 may also, or alternatively, communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies. In some embodiments, as further described below, AP 112 may perform methods for time sharing for multiple STAs on a single RU for a given transmission, for example in a DL OFDMA transmission.

Figure 3A:
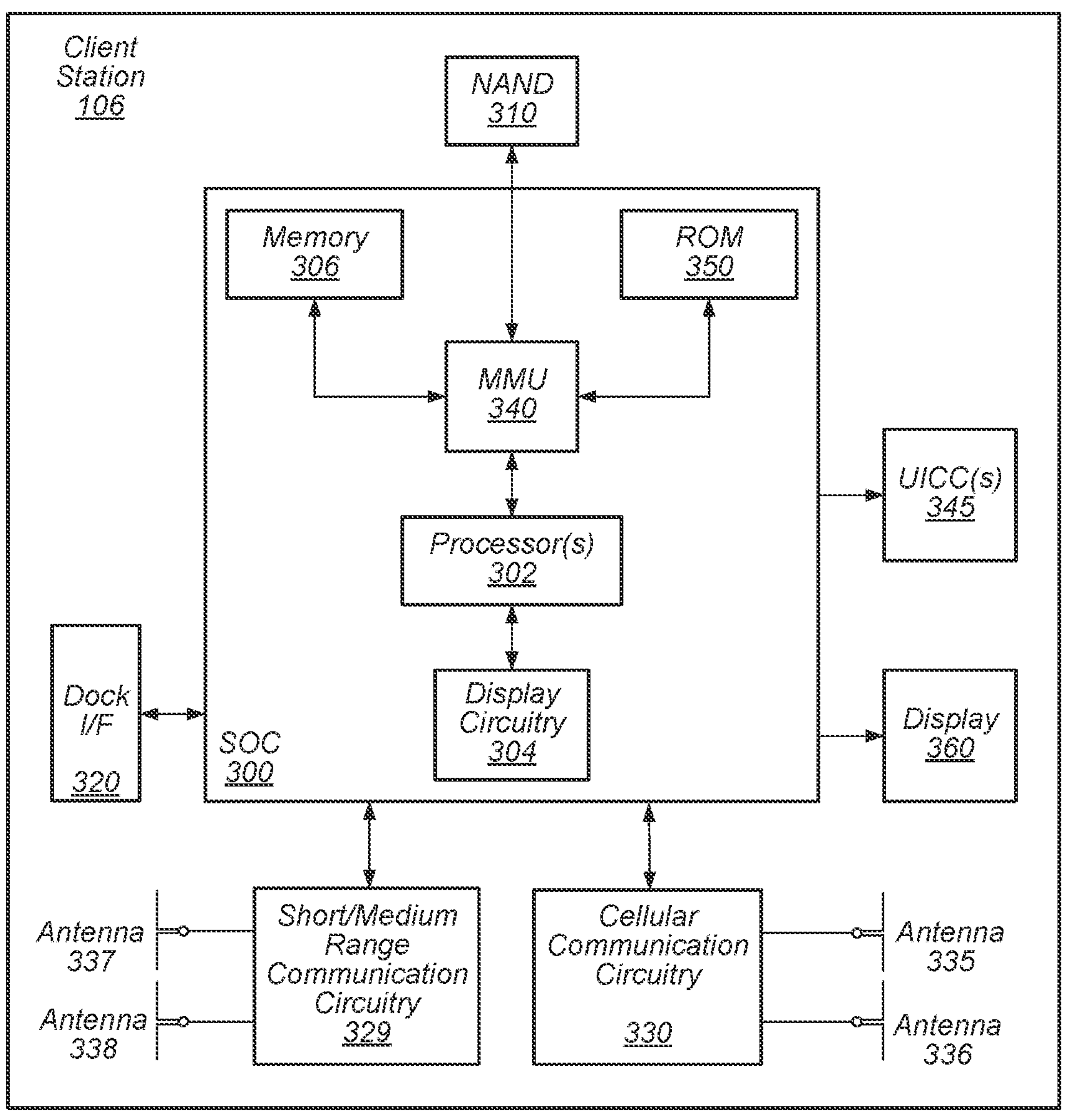
FIG. 3A (3) illustrates an example simplified block diagram of a mobile station (UE), according to some embodiments.

FIG. 3A—Client Station Block Diagram

FIG. 3A illustrates an example simplified block diagram of a client station 106. It is noted that the block diagram of the client station of FIG. 3A is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may perform memory protection and page table translation or set up. In some embodiments, the MMU 340 may be included as a portion of the processor(s) 302.

As noted above, the client station 106 may communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may perform methods for time sharing for multiple STAs on a single RU for a given transmission, for example in a DL OFDMA transmission.

As described herein, the client station 106 may include hardware and software components for implementing the features described herein. For example, the processor 302 of the client station 106 may implement part or all of the features described herein, e.g., by executing program instructions stored on a memory medium (e.g., a non-transitory computer-readable memory medium). Alternatively (or in addition), processor 302 may be a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that perform the functions of processor 302. In addition, each integrated circuit may include circuitry (e.g., first circuitry, second circuitry, etc.) to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) to perform the functions of cellular communication circuitry 330 and short-range wireless communication circuitry 329.

Figure 3B:
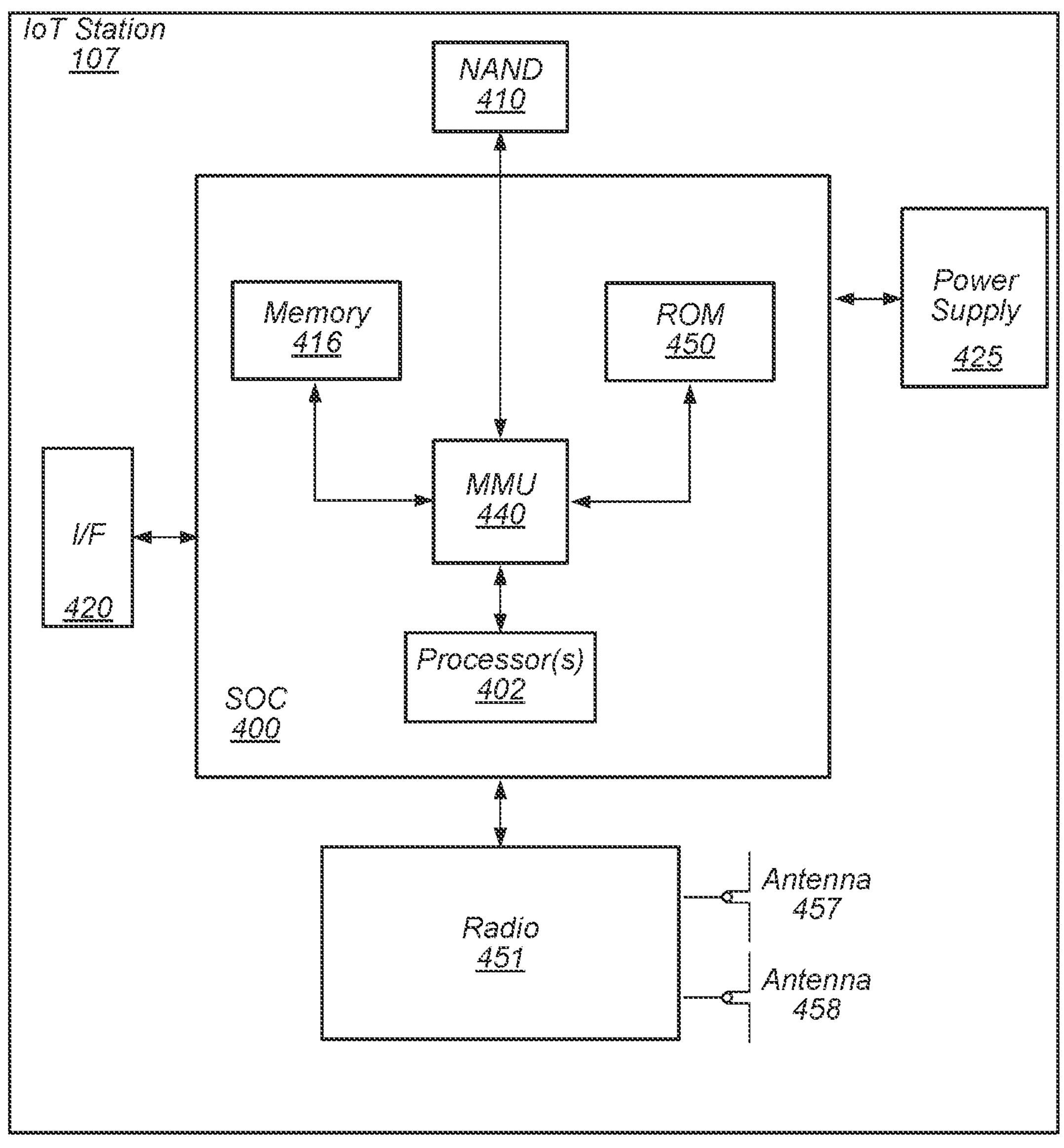
FIG. 3B (4) illustrates an example simplified block diagram of an Internet of Things (IoT) station, according to some embodiments.

FIG. 3B: Internet of Things (IoT) Station

FIG. 3B illustrates an example simplified block diagram of an IoT station 107, according to some embodiments. According to embodiments, IoT station 107 may include a system on chip (SOC) 400, which may include one or more portions for performing one or more purposes (or functions or operations). The SOC 400 may be coupled to one or more other circuits of the IoT station 107. For example, the IoT station 107 may include various types of memory (e.g., including NAND flash 410), a connector interface (I/F) 420 (e.g., for coupling to a computer system, dock, charging station, light (e.g., for visual output), speaker (e.g., for audible output), etc.), a power supply 425 (which may be non-removable, removable and replaceable, and/or rechargeable), and communication circuitry (radio) 451 (e.g., BT/BLE and/or WLAN).

The IoT station 107 may include at least one antenna, and in some embodiments, multiple antennas 457 and 458, for performing wireless communication with a companion device (e.g., client station 106, AP 112, and so forth) as well as other wireless devices (e.g., client station 106, AP 112, other IoT stations 107, and so forth). In some embodiments, one or more antennas may be dedicated for use with a single radio and/or radio protocol. In some other embodiments, one or more antennas may be shared across two or more radios and/or radio protocols. The wireless communication circuitry 451 may include WLAN logic and/or WPAN logic, such as BT/BLE logic, for example. In some embodiments, the wireless communication circuitry 451 may include multiple receive chains and/or multiple transmit chains for receiving and/or transmitting multiple spatial streams, such as in a multiple-input multiple output (MIMO) configuration.

As shown, the SOC 400 may include processor(s) 402, which may execute program instructions for the IoT station 107. The processor(s) 402 may also be coupled (directly or indirectly) to memory management unit (MMU) 440, which may receive addresses from the processor(s) 402 and translate those addresses into locations in memory (e.g., memory 416, read only memory (ROM) 450, NAND flash memory 410) and/or to other circuits or devices, such as the wireless communication circuitry 451. The MMU 440 may perform memory protection and page table translation or set up. In some embodiments, the MMU 440 may be included as a portion of the processor(s) 402.

As noted above, the IoT station 107 may be configured to communicate wirelessly with one or more neighboring wireless devices. In some embodiments, as further described below, IoT station 107 may perform methods for time sharing for multiple STAs on a single RU for a given transmission, for example in a DL OFDMA transmission.

Time Sharing Among Multiple Stations (STAs) in a Single Resource Unit (RU)

Figures 4, 5:
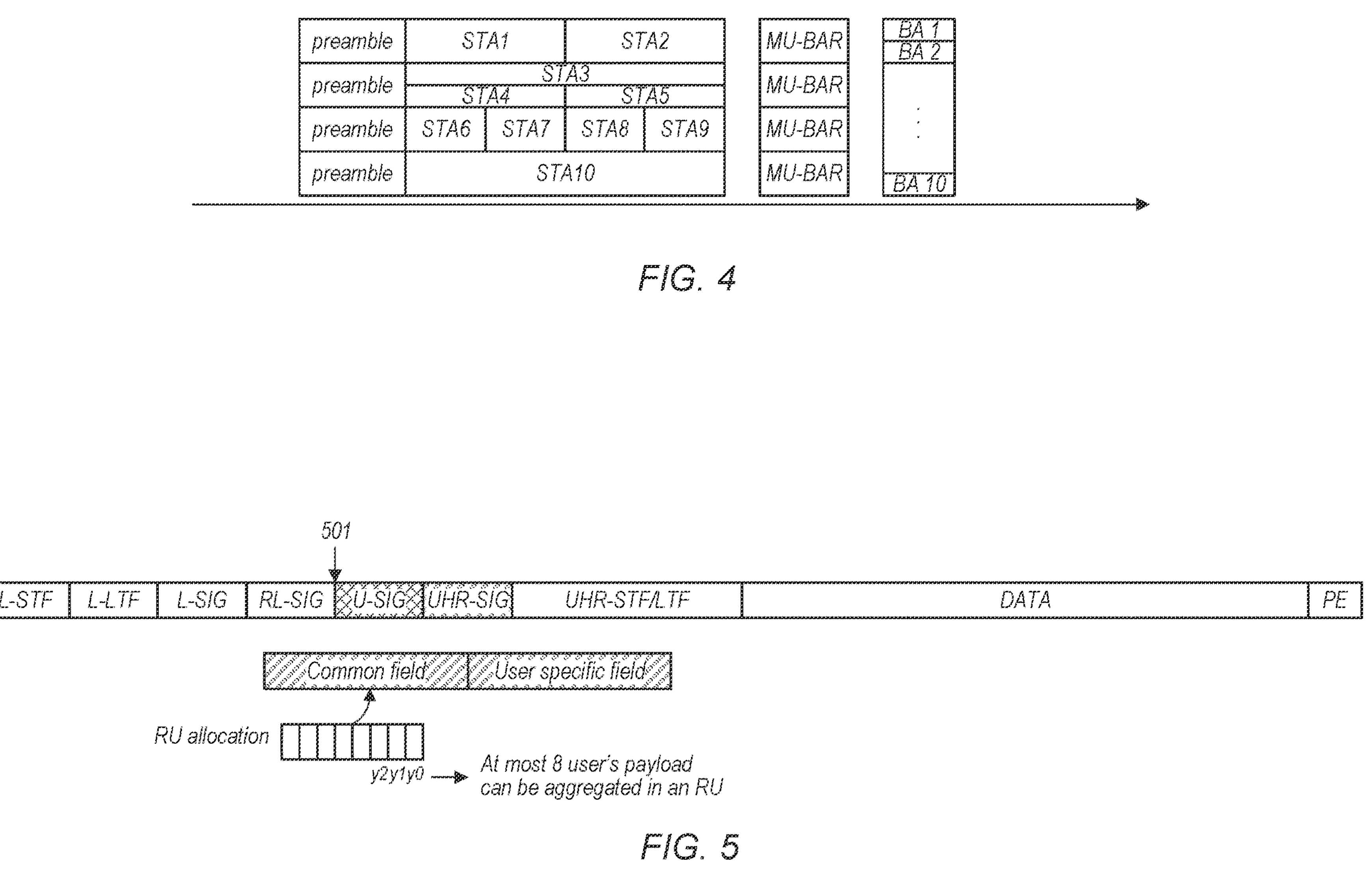
FIG. 4 shows an example frame exchange sequence for a downlink multiuser (MU)
FIG. 5 shows an example field structure of an IEEE 802.11 (Physical Layer Protocol Data Unit—PPDU) frame that uses the hybrid DL MU signaling in UHR SIG to indicate time-sharing for DL OFDMA transmissions, according to some embodiments.

FIG. 4 shows an exemplary frame exchange sequence for multiuser (MU) downlink. As shown in FIG. 4, the data payload is for ten stations STA1-STA10 contained in a single DL MU PPDU. In this PPDU, STA1 and STA2 share one single RU, STA 4 and STA5 share another single RU, and STA 6, STA7, STA8 and STA9 share a single RU. Additionally, MU-BAR is used to solicit the acknowledgement from these STAs. RU allocation information is communicated to clients in the preamble. At the Physical layer, RU allocation information can be found in the HE-SIG-B field of the PHY header for an IEEE 802.11ax MU frame or in the EHT-SIG field of the PHY header for an IEEE 802.11be MU frame. Both SIG fields are used to communicate RU assignments to clients. Generally, the SIG field consists of two sub-fields, the common field and the user-specific field. A sub-field of the common field is used to indicate how a channel is partitioned into various RUs. For example, a 20 MHz channel might be subdivided into one 106-tone RU and four 26-tone RUs. The user-specific field includes multiple user fields that are used to communicate which users are assigned to each individual RU.

There may be instances when there is a need to support time sharing from multiple STAs on a single RU during wireless communications, e.g., during IEEE 802.11 communications in a DL OFDMA transmission. Such transmissions may be referred to as Time Sharing OFDMA (TS-OFDMA) transmissions. Achieving such time-sharing presents difficulties, however, as the current SIG-B design for pure DL OFDMA transmissions represents an injection mapping from scheduled users to allocated RUs.

Currently, IEEE 802.11 makes provisions only for a single station's payload for each RU for downlink OFDMA transmissions. However, there may instances where it may be advantageous to enable payload transmission of multiple stations on a single resource unit. In the current DL OFDMA preamble design, an RU cannot be allocated for multiple users. In other words, each RU is allocated to a single station. In order to address this deficiency, in some embodiments, new signaling may be introduced to enable an access point (AP) to include information/signaling in the preamble or in other frames. A receiver that receives this information/signaling may accordingly determine in which RU it should decode to receive its allocated data or payload, allowing multiple receivers or STAs to share a single RU.

First Option: Utilize Hybrid DL MU Signaling in Ultra High Reliability Signal (UHR-SIG)

FIG. 5 shows an example field structure of an IEEE 802.11 (Physical Layer Protocol Data Unit—PPDU) frame that uses the hybrid DL MU (DL MU-MIMO is used in an RU of an OFDMA transmission) signaling in UHR SIG to indicate time-sharing for DL OFDMA transmissions, according to some embodiments. As indicated in FIG. 5, one reserved bit in the U-SIG field (see 501) may be used to indicate one variation of the MU format, such that it is treated as a TS-OFDMA not hybrid DL MU. The current standard (IEEE 802.11) allows for hybrid DL MU transmissions. In the current SIG-B design for the common field, for the layout of the RU locations, there are 3 bits to indicate how many users or how many stations may perform the MU MIMO spatial domain multiplexing in a single RU. Essentially, different users may have different spatial streams.

In some embodiments, reserved-bit signaling may be used to indicate a different mode of operation, e.g., denoted as TS-OFDMA (operation). For example, when the reserved bit is set in the U-SIG field, the receiver may interpret the indications (y2, y1, y0) in the Common Field that corresponds to a specific RU as indicating time shared DL OFDMA. In other words, with the reserved bit set in the U-SIG field, the receiver may interpret a segment (or specific bits) within the common field as information indicating time-sharing of a single RU for a DL-OFDMA transmission, as opposed to interpreting those specific bits as indicating MU-MIMO on that single RU.

In some embodiments, a transmitter, e.g., an AP may announce a predefined number 'N' in the beacon frame such that different receivers may have N number of PHY OFDM symbols. In other words, the PHY symbols 0 to N−1 may carry the encoded payloads for the first receiver, PHY symbols N to 2N−1 may carry the encoded payloads for the second receiver, etc. In the user specific field, the starting spatial stream number and the number of spatial streams may be used to indicate the index of each receiver's starting symbol. In this way, the receiver may end decoding earlier once the last symbol that carries the payload is reached.

Second Option: Define Group Association IDs (gAIDs) with Unused AID Space

Currently, when a station is associated with an AP, it is assigned a unique AID, which ranges from 1 to 2007. The available bits indicating the AID or AID value make provisions for additional values from 2008-2047, which are currently not used when assigning an AID to stations.

Pursuant to the above, in some embodiments, the presently unused AID (or AID values) included in the range [2008-2047] may be used for creating predefined group-AIDs (gAIDs). The AP may use the gAID for the user specific field in the UHR-SIG field (in reference to FIG. 5). AID 2045 and 2046 or any already used value in this space may be excluded. Management operation for gAID may be similar to the IEEE 802.11ac Group ID management operation. Stations identified as included in the gAID group or having been assigned to the gAID group may all continue to decode the payload on the RU. The AP may announce the gAID and the stations may follow the AP.

A gAID may be useful because the User Specific Field (in reference to FIG. 5) may include an AID list for each RU. Upon detecting the AID list, the receiver may search the list to determine whether an AID identifying the receiver is included. Similarly, for a gAID, any station may determine whether it is part of the gAID group and may go to the corresponding RU to decode (find) its payload.

Third Option: Predefined Special AID and Use of a Bloom Filter

Figure 6:
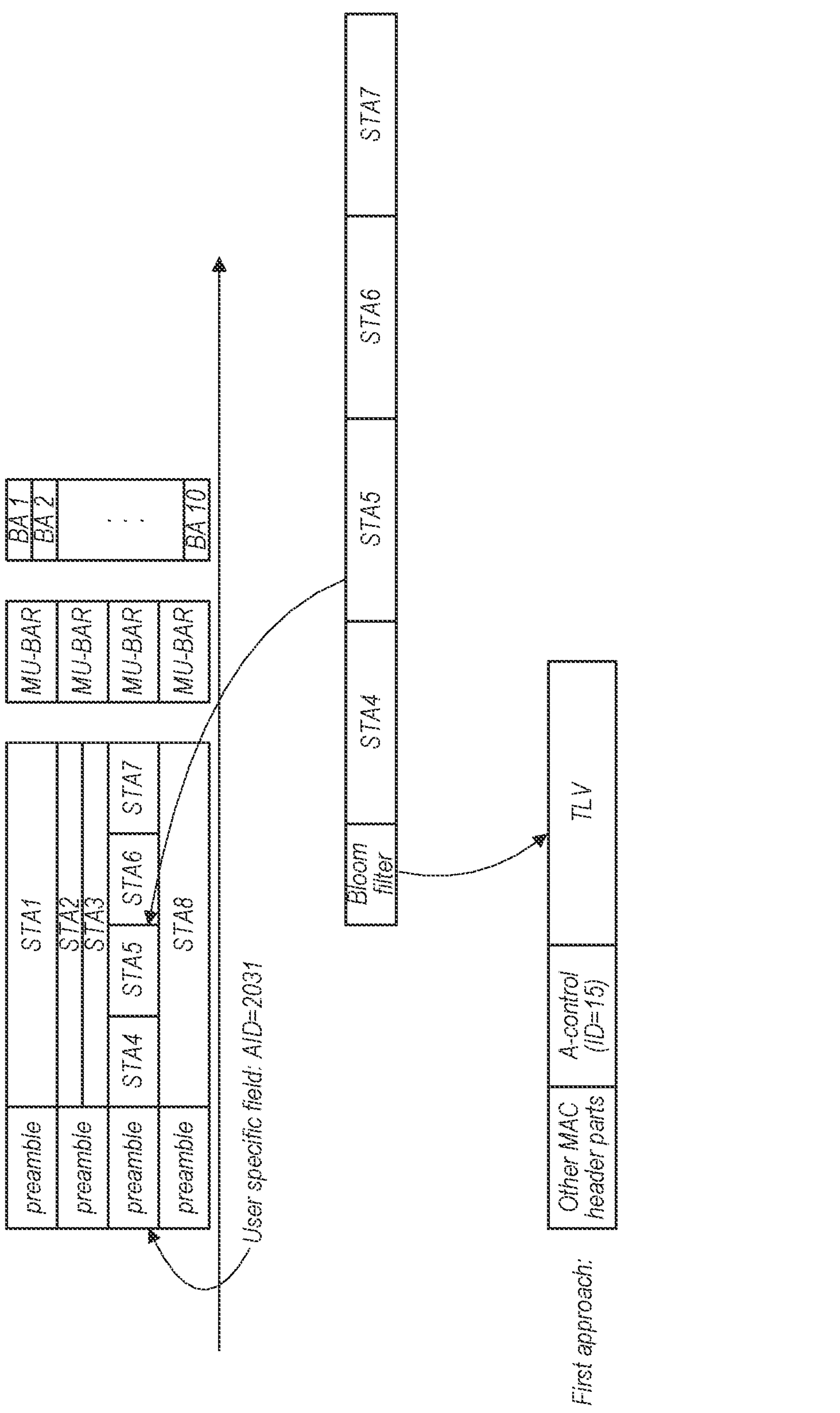
FIG. 6 shows an example frame exchange sequence for multiuser (MU) downlink, which implements a special AID and use of a bloom filter, according to some embodiments.

FIG. 6 shows an exemplary frame exchange sequence for a downlink multiuser (MU), which implements a special AID and use of a bloom filter, according to some embodiments. The third option is also related to the currently unused AID space [2008-2047]. In some embodiments, a special AID (from within the currently unused AID space) may be selected, and a probabilistic data structure may be used to determine STA membership corresponding to the special AID. For example, as seen in FIG. 6, a list of special AIDs may be established (e.g., in the standards), and these AIDs may be associated with time sharing on a single RU. The exemplary diagram of FIG. 6 shows a special AID of 2031 indicated in the preamble associated with station 5 (STA 5). When a special AID is included in the preamble, the station(s) (in this example, stations STA4, STA5, STA6, and STA7) may continue to decode to determine whether the station is a participant in the transmission on the single RU. A bloom filter included at the front of the aggregated frames in this single RU may be used by the station(s) to determine whether the station is a member of a group of users expecting a payload transmitted on this single RU. There may be two approaches for including the bloom filter in the front of the frame.

According to a first approach (indicated in FIG. 6), a new QoS-Null frame may be used with the ID of the A-Control field set as 15. Additional control payload may be added in this QoS-Null frame. This control payload may not be encrypted. A general type-length-value field may be used to carry the control payload. The bloom filter may then simply be one type of this control payload, as illustrated in the TLV field in the exemplary diagram of FIG. 6. The A-Control field may be used to indicate that this is a special case. When the station supports this mechanism, it may recognize the bloom filter and determine whether the station is part of the time-shared transmission on the RU.

According to a second approach, a new management frame (not shown) may be designed to include the bloom filter and define membership.

In the above approaches, one RU may be associated with one special AID. If there are multiple special AIDs and a station determines it is a member of more than one AID designated grouping, it may become difficult for the station to concurrently decode on multiple RUs. Overall, it may be difficult for a station to support such concurrent decoding.

Figures 7, 8:
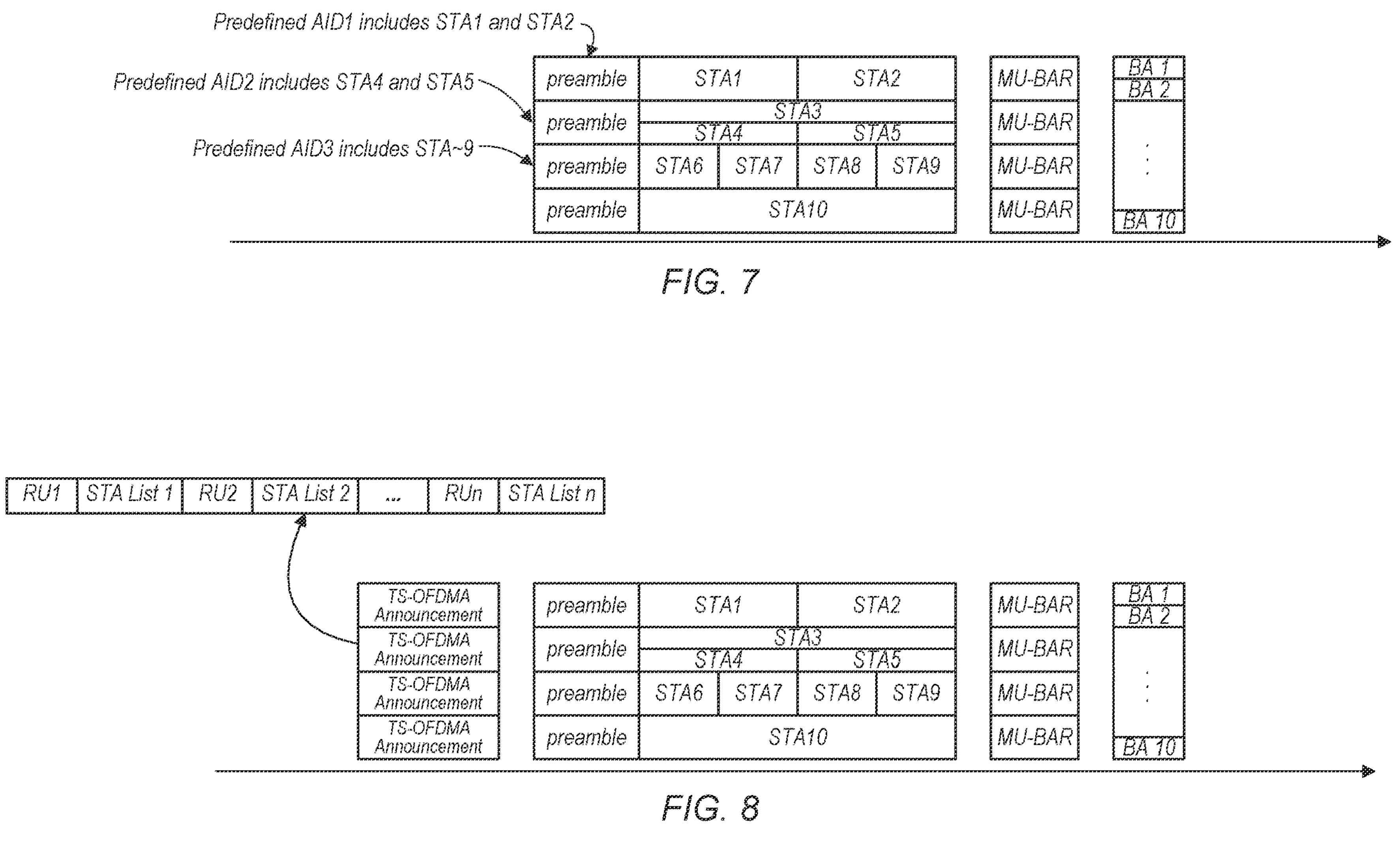
FIG. 7 shows an example frame exchange sequence for multiuser (MU) downlink, which implements multiple predefined AIDs, according to some embodiments.
FIG. 8 shows an example frame exchange sequence for multiuser (MU) downlink, which implements announcement of time sharing OFDMA (TS-OFDMA), according to some embodiments.

FIG. 7 shows an exemplary frame exchange sequence for a downlink multiuser (MU), which implements multiple predefined AIDs, according to some embodiments. In order to address the above issue regarding a station potentially expected to concurrently decode on multiple RUs, the mechanism may be extended to multiple predefined AIDs. As the AP does not assign AID randomly but using a certain grouping, during association the AP may indicate these predefined AIDs for the group identification. On the AP side the usage of predefined AIDs may prevent the scenario of one particular STA being part of two different groups at the same time, and may therefore prevent any of the stations having to concurrently decode on multiple RUs. For example, as shown in FIG. 7, a predefined AID1 may represent or correspond to a group of stations that include STA1 and STA2 as members, a predefined AID2 may represent or correspond to a group of stations that includes STA4 and STA5 as members, and a predefined AID3 may represent or correspond to a group of stations that includes STA9 as a member.

Fourth Option: DL TS-OFDMA Announcement

FIG. 8 shows an exemplary frame exchange sequence for a downlink multiuser (MU), which implements announcement of time sharing OFDMA (TS-OFDMA), according to some embodiments. As shown in FIG. 8, the AP may indicate to the stations, ahead of time via signaling prior to the preamble, which RU each station is associated with. While this represents an effective indication to the stations, it does introduce additional signaling and may therefore incur signaling overhead for each transmission.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
- a processor configured to:
  - cause a wireless station to receive, from a transmitter, information indicating that the wireless station is to time-share a resource unit (RU) with one or more other wireless stations also communicating with the transmitter;
  - cause the wireless station to use the RU in a time-shared manner with the one or more other wireless stations during wireless communications with the transmitter, responsive to the information indicating that the wireless station is to time-share the RU; and
  - cause the wireless station to receive, from the transmitter, a beacon frame comprising information conveying a predetermined number that indicates a number of symbols to be used by the wireless station for time-shared wireless communications with the transmitter.

2. The apparatus of claim 1, wherein the processor is further configured to:
- cause the wireless station to use the RU in the time-shared manner for downlink orthogonal frequency-division multiple access communications with the transmitter.

3. The apparatus of claim 1, wherein the information is received in a packet frame, wherein the information is provided via:
- a reserve bit set in a preamble of the packet frame; and
- a specified number of bits in a common field of the packet frame.

4. The apparatus of claim 1, wherein the information includes a group identifier identifying a group of devices that includes the wireless station and one or more of the other wireless stations.

5. The apparatus of claim 4, wherein the information is received in a packet frame, and wherein the group identifier is used by the transmitter for a user specific field in the packet frame.

6. The apparatus of claim 5, wherein the user specific field comprises a device identifier list for at least one RU.

7. The apparatus of claim 6, wherein the processor is further configured to:
- search the device identifier list to determine whether it includes an identifier corresponding to the wireless station.

8. The apparatus of claim 1, wherein the information comprises a special identifier associated with the RU, wherein the processor is further configured to:
- determine whether the wireless station is associated with the special identifier.

9. The apparatus of claim 8, wherein the processor is further configured to:
- use a Bloom filter provided at a beginning of a packet frame in determining whether the wireless station is associated with the special identifier.

10. The apparatus of claim 1, wherein the information comprises a predefined identifier associated with the wireless station and at least one designated wireless station of the one or more other wireless stations.

11. A wireless station comprising:
- radio circuitry configured to transmit and receive wireless signals for wireless communications of the wireless station; and
- a processor communicatively coupled to the radio circuitry and configured to interoperate with the radio circuitry to:
  - cause the wireless station to receive, from an access point (AP), information indicating that the wireless station is to time-share a resource unit (RU) with one or more other wireless stations also communicating with the AP;
  - cause the wireless station to use the RU in a time-shared manner with the one or more other wireless stations during wireless communications with the AP, responsive to the information indicating that the wireless station is to time-share the RU; and
  - cause the wireless station to receive, from the AP, a beacon frame comprising information conveying a predetermined number that indicates a number of symbols to be used by the wireless station for time-shared wireless communications with the AP.

12. The wireless station of claim 11, wherein the processor is further configured to:

cause the wireless station to use the RU in the time-shared manner for downlink orthogonal frequency-division multiple access communications with the AP.

13. The wireless station of claim 11, wherein the information is received in a Physical Layer Protocol Data Unit (PPDU) frame, wherein the information is provided via:

a reserve bit set in a universal signal (U-SIG) field of the PPDU frame; and a specified number of bits in a common field of the PPDU frame.

14. The wireless station of claim 11, wherein the information includes a group association identifier (gAID), wherein the wireless station and at least one of the one or more other wireless stations are associated with the gAID.

15. The wireless station of claim 11, wherein the information comprises a special association identifier (AID) associated with the RU, wherein the processor is further configured to determine whether the wireless station is associated with the special AID.

16. A non-transitory memory element storing instructions executable by a processor to:

cause a transmitter to transmit information to a wireless station, wherein the information indicates that the wireless station is to time-share a resource unit (RU) with one or more other wireless stations also communicating with the transmitter;

cause the transmitter to use the RU to communicate in a time-shared manner with the wireless station and the one or more other wireless stations, responsive to the information indicating that the wireless station is to time-share the RU; and cause the transmitter to transmit a beacon frame comprising information conveying a predetermined number that indicates a number of symbols to be used by the wireless station for time-shared wireless communications with the transmitter.

17. The non-transitory memory element of claim 16, wherein the instructions are further executable by the processor to:

cause the transmitter to transmit at least a portion of the information in a preamble.

18. The non-transitory memory element of claim 16, wherein the instructions are further executable by the processor to:

cause the transmitter to transmit at least a portion of the information via special signaling indicating the RU with which the wireless station is associated.

19. The non-transitory memory element of claim 16, wherein the information is transmitted in a packet frame, wherein the information is provided via:

a reserve bit set in a preamble of the packet frame; and a specified number of bits in a common field of the packet frame.

20. The non-transitory memory element of claim 16, wherein the information includes a group identifier identifying a group of devices that includes the wireless station and one or more of the other wireless stations.

* * * * *